United States Patent
Foster et al.

(10) Patent No.: US 12,369,533 B2
(45) Date of Patent: Jul. 29, 2025

(54) TREE PRUNER

(71) Applicant: WOODLAND TOOLS, INC., Madison, WI (US)

(72) Inventors: Charlton G. A. Foster, Middleton, WI (US); James W. Meiller, Fitchburg, WI (US)

(73) Assignee: WOODLAND TOOLS, INC., Madison, WI (US)

( * ) Notice: Subject to any disclaimer, the term of this patent is extended or adjusted under 35 U.S.C. 154(b) by 266 days.

(21) Appl. No.: 18/172,777

(22) Filed: Feb. 22, 2023

(65) Prior Publication Data

US 2024/0049647 A1    Feb. 15, 2024

Related U.S. Application Data

(60) Provisional application No. 63/398,145, filed on Aug. 15, 2022.

(51) Int. Cl.
*A01G 3/025* (2006.01)
*A01G 3/02* (2006.01)

(52) U.S. Cl.
CPC ........... *A01G 3/0255* (2013.01); *A01G 3/021* (2013.01)

(58) Field of Classification Search
CPC .......... A01G 3/02; A01G 3/021; A01G 3/025; A01G 3/0251; A01G 3/0255
USPC ......................... 30/234, 244, 245, 249, 296.1
See application file for complete search history.

(56) References Cited

U.S. PATENT DOCUMENTS

| | | | | |
|---|---|---|---|---|
| 1,761,469 A | * | 6/1930 | Donkel | A01G 3/0255 30/249 |
| 1,765,187 A | * | 6/1930 | Warrenfeltz | A01G 3/0255 30/251 |
| 1,789,824 A | * | 1/1931 | Lowe | A01G 3/0255 30/251 |
| 1,812,387 A | * | 6/1931 | Upton | A01G 3/0255 30/246 |
| 2,030,550 A | * | 2/1936 | Smith | A01G 3/0255 403/312 |
| 2,664,628 A | * | 1/1954 | Porter | A01G 3/0255 30/249 |
| 3,360,859 A | * | 1/1968 | Watson | A01G 3/0255 30/249 |
| 4,033,036 A | * | 7/1977 | Morris | A01G 3/0255 30/249 |
| 4,696,107 A | * | 9/1987 | Held | A01G 3/0255 30/249 |

(Continued)

*Primary Examiner* — Jason Daniel Prone
(74) *Attorney, Agent, or Firm* — Charles S. Sara; Yanjun Ma; DeWitt LLP (57) ABSTRACT

A tree pruner configured to reduce the width of the device to facilitate reduction of shipping costs and store space. The tree pruner includes a leaf spring having a first end mounted onto a first end of a lever, and second end connected to a first end of a stop pin, wherein the stop pin penetrates the lever. When the lever is at a first position in a rest condition at shipping or store front, the leaf spring is in tension to exert force on the stop pin to engage with an outer surface of a back hook to hold the lever at the position. When the lever is pulled to a second position for use, the leaf spring is at rest. The the stop pin penetrates all the way through the lever and engages with an edge of the back hook to serve as an end stop for the lever movement.

2 Claims, 10 Drawing Sheets

(56) References Cited

U.S. PATENT DOCUMENTS

| | | | | |
|---|---|---|---|---|
| 4,760,645 A * | 8/1988 | Davis | A01G 3/0255 | 30/249 |
| 4,964,216 A * | 10/1990 | Gosselin | A01G 3/0251 | 30/200 |
| 5,426,857 A * | 6/1995 | Linden | A01G 3/02 | 30/254 |
| 5,634,276 A * | 6/1997 | Lin | A01G 3/0255 | 30/249 |
| 5,933,965 A * | 8/1999 | Linden | A01G 3/0255 | 30/249 |
| 5,950,315 A * | 9/1999 | Linden | A01G 3/0255 | 30/249 |
| 5,960,546 A * | 10/1999 | Cooke | A01G 3/0255 | 30/249 |
| 5,970,617 A * | 10/1999 | Chang | A01G 3/0255 | 30/249 |
| 6,345,445 B1 * | 2/2002 | Schofield | A01G 3/0255 | 30/249 |
| 6,385,852 B1 * | 5/2002 | Huang | A01G 3/0255 | 30/249 |
| 6,446,343 B1 * | 9/2002 | Huang | A01G 3/0255 | 30/249 |
| 6,526,664 B2 * | 3/2003 | Cech | A01G 3/0255 | 30/249 |
| 6,671,963 B1 * | 1/2004 | Huang | A01G 3/0255 | 30/249 |
| 7,926,186 B2 * | 4/2011 | McLoughlin | A62C 8/00 | 30/296.1 |
| 7,937,839 B2 * | 5/2011 | Fidgen | A01G 3/0255 | 30/296.1 |
| 2003/0106223 A1 * | 6/2003 | Lee | A01G 3/0255 | 30/249 |
| 2009/0119929 A1 * | 5/2009 | Monnig | A01G 3/0255 | 30/249 |
| 2018/0036868 A1 * | 2/2018 | Maki | A01G 3/0255 | |

* cited by examiner

TREE PRUNER

CROSS-REFERENCE TO RELATED APPLICATION

The application claims priority to U.S. provisional application Ser. No. 63/398,145, filed Aug. 15, 2022, which is incorporated herein by reference in its entirety.

FIELD OF THE INVENTION

The present disclosure is directed to a tree pruner, specifically a tree pruner configured to reduce the width of the device to facilitate reduction of shipping costs and store space.

BACKGROUND

Current tree pruners typically comprise a leverage to reduce the user's force required in operation. Configuration of the lever makes the product wide at the head. This significantly increases the packaging and shipping costs, because larger boxes are needed to package the tree pruner and more shipping spaces are required. Shelf space is also limited because tree pruners with a lever occupy a larger space. This limits the number of products that can be placed in store. Thus, there is an unmet need in the art to help reduce the width of tree pruners to reduce the shipping costs and store space.

SUMMARY OF THE INVENTION

Disclosed herein is a tree pruner having a stop pin arrangement to reduce the width of the device to facilitate reduction of shipping costs and store space. The tree pruner 1 comprises at a head portion:

a back hook 10 having a first portion 11 connected to a distal end of a pole 5, a central portion 12 extending distally from the first portion 11, and an extended portion 13 projecting laterally from the central portion 12 and bending proximally to form a hook;

a lever 20 having a first end pivotally connected to the central portion 12 of the back hook 10 and a second end extending distally from the first end, positioned away from the lateral extension of the extended portion 13 of the back hook 10;

a blade 30 having a distal end connected to the first end of the lever 20 and configured to move towards the extended portion 13 of the back hook 10 to complete a cutting motion when the second end of the lever is actuated; and a leaf spring 40 on an outer surface of the lever 20, wherein the leaf spring 40 has a first end 41 mounted to the first end of the lever 20, and a second end 42 connected to a first end 51 of a stop pin 50, wherein the stop pin 50 penetrates a middle portion of the lever 20.

In some embodiments, the first end 41 of the leaf spring 40 is mounted onto the first end of the lever 20 at where the lever 20 is pivotally connected to the back hook 10.

The lever 20 of the tree pruner 1 is held at a first position when the pruner 1 is at shipping or store front, and pulled to a second position to get ready for use, wherein the tree pruner 1 has a smaller width when the lever 20 is at the first position than the second position.

When the lever 20 is held at the first position, the leaf spring 40 is in tension. The second end 42 of the leaf spring 40 exerts force on the first end 51 of the stop pin 50, such that a second end 52 of the stop pin 50 engages with an outer surface of the back hook 10 to hold the lever 20 at the first position. At this position, not an entirety of the stop pin 50 penetrates the lever 20.

When the lever 20 is at the second position, the leaf spring 40 is at rest. A greater portion of the stop pin 50 penetrates the lever 20. At this position, the stop pin 50 engages with an edge of the back hook 10 to restrict movement of the lever 20 to where the stop pin 50 engages with the edge of the back hook 10.

The objects and advantages of the disclosure will appear more fully from the following detailed description of the preferred embodiment of the disclosure made in conjunction with the accompanying drawings.

DETAILED DESCRIPTION OF THE INVENTION

Referring to FIGS. 1-10, a preferred embodiment of the present disclosure includes a tree pruner 1 comprising at a head portion a back hook 10, a lever 20, and a blade 30. The back hook 10 has a first portion 11 connected to a distal end of a pole 5, a central portion 12 extending distally from the first portion 11, and an extended portion 13 projecting laterally from the central portion 12 and bending proximally to form a hook. The lever 20 has a first end pivotally connected to the central portion 12 of the back hook 10 and a second end extending distally from the first end, positioned away from the lateral extension of the extended portion 13 of the back hook 10. In the exemplary embodiment shown herein, the lever 20 and the back hook 10 are pivotally connected by a screw 61 and a nut 62. The blade 30 has an a distal end connected to a first end of the lever 20. The lever 20 is typically connected to a rope at the second end for the user to pull. When the second end of the lever 20 is pulled downwards, the blade 30 moves toward the extended portion 13 of the back hook 10 to complete a cutting motion.

Figure 1:
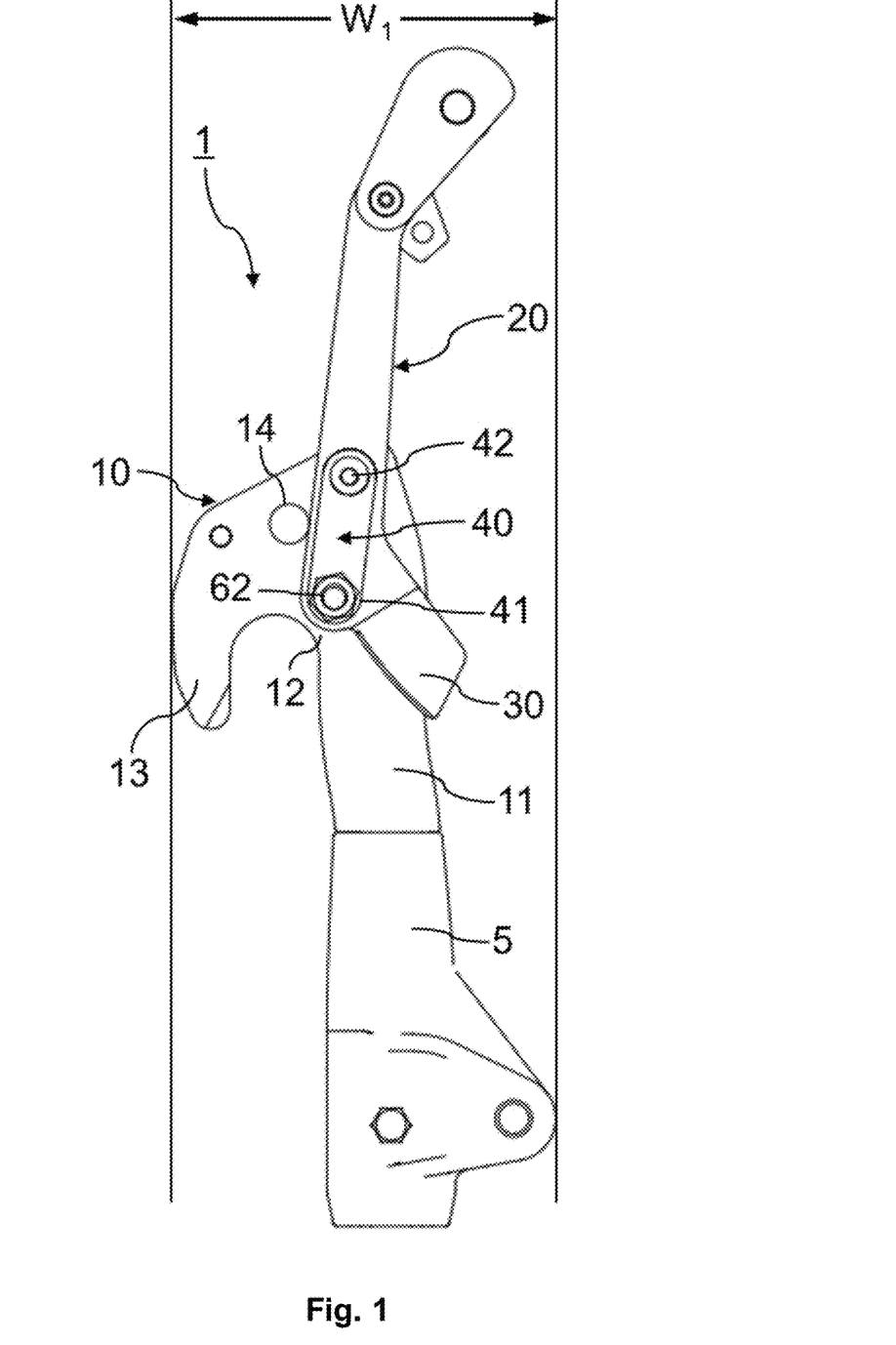
FIG. 1 is a front view of a head portion of a tree pruner having a lever held at a first position when the tree pruner is at shipping or store front, according to a preferred embodiment of the present disclosure.
Figure 2:
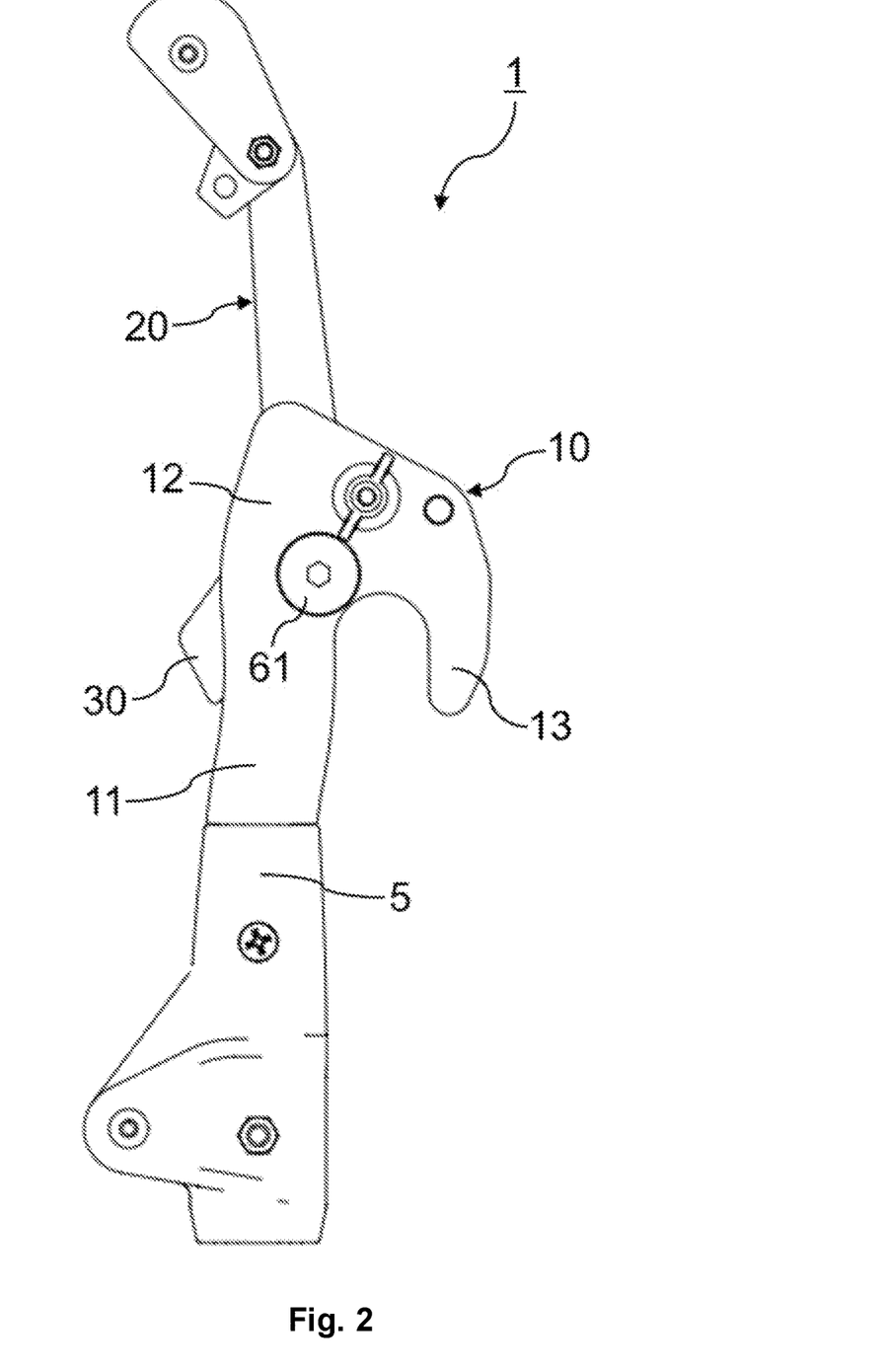
FIG. 2 is a rear view of the head portion of the tree pruner having the lever held at the first position when the tree pruner is at shipping or store front, according to the preferred embodiment of the present disclosure.
Figure 3:
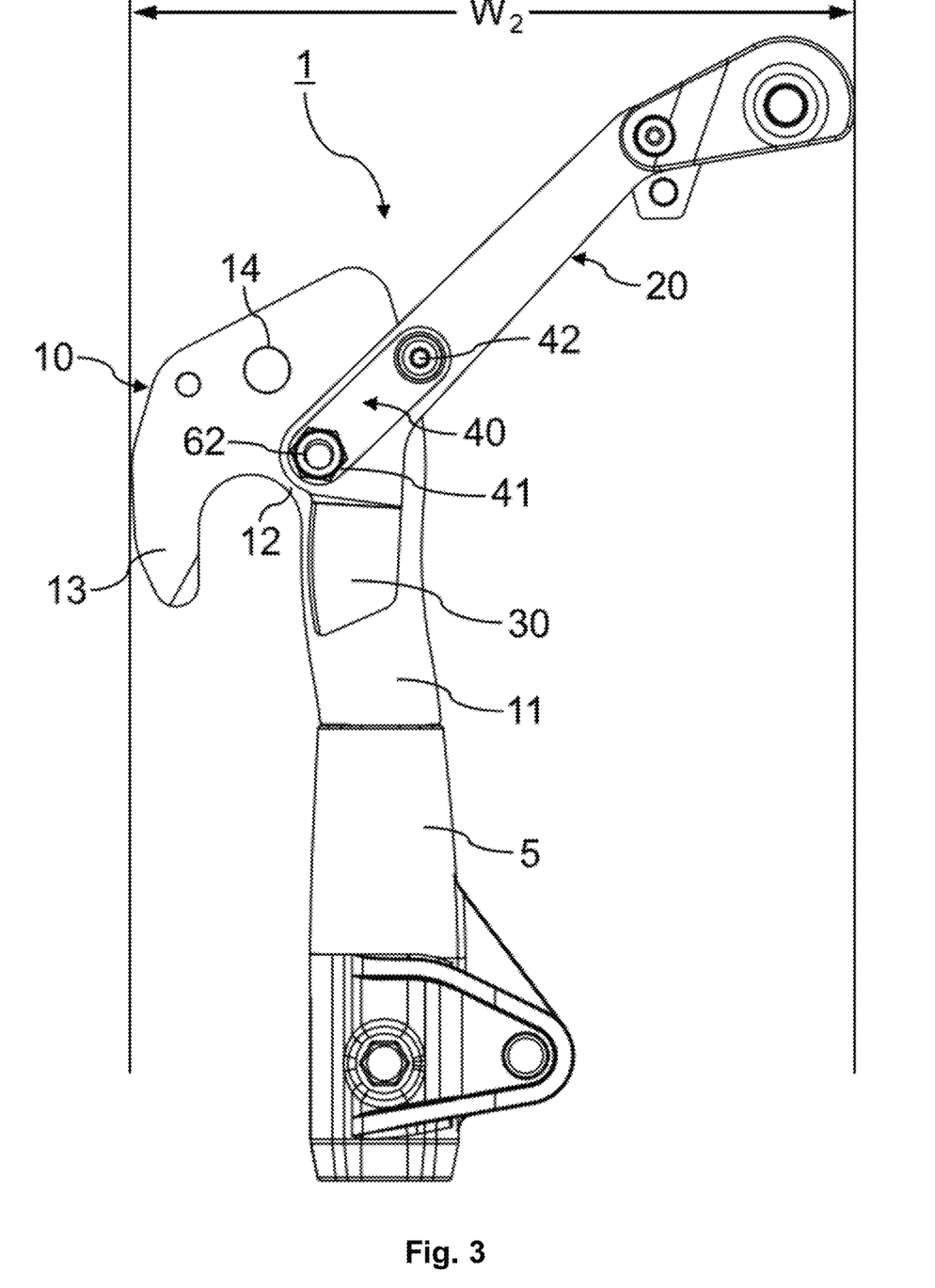
FIG. 3 is a front view of the head portion of the tree pruner when the lever is pulled to the second position to get ready for use, according to the preferred embodiment of the present disclosure.
Figure 4:
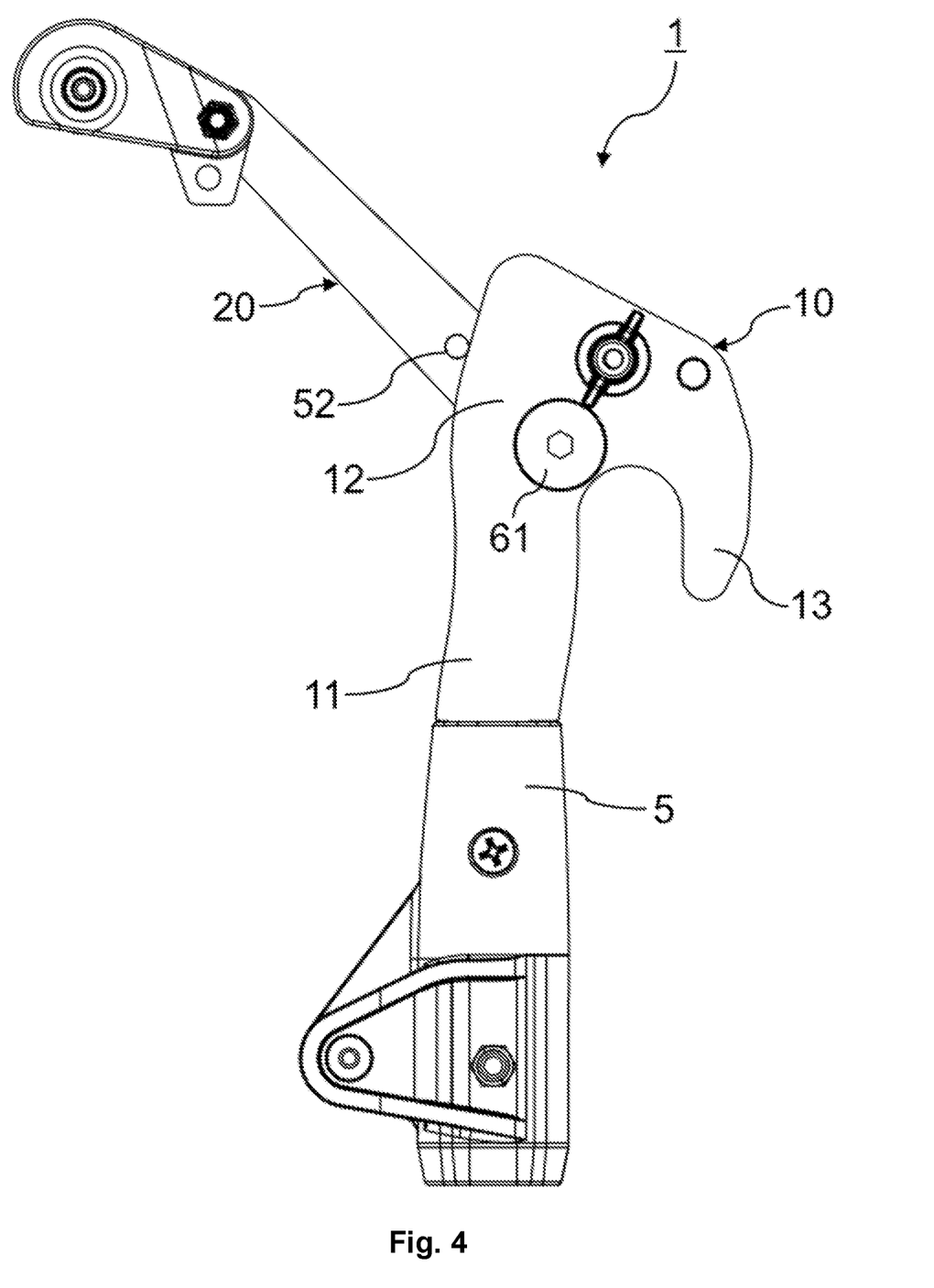
FIG. 4 is a rear view of the head portion of the tree pruner when the lever is pulled to the second position to get ready for use, according to the preferred embodiment of the present disclosure.
Figure 5:
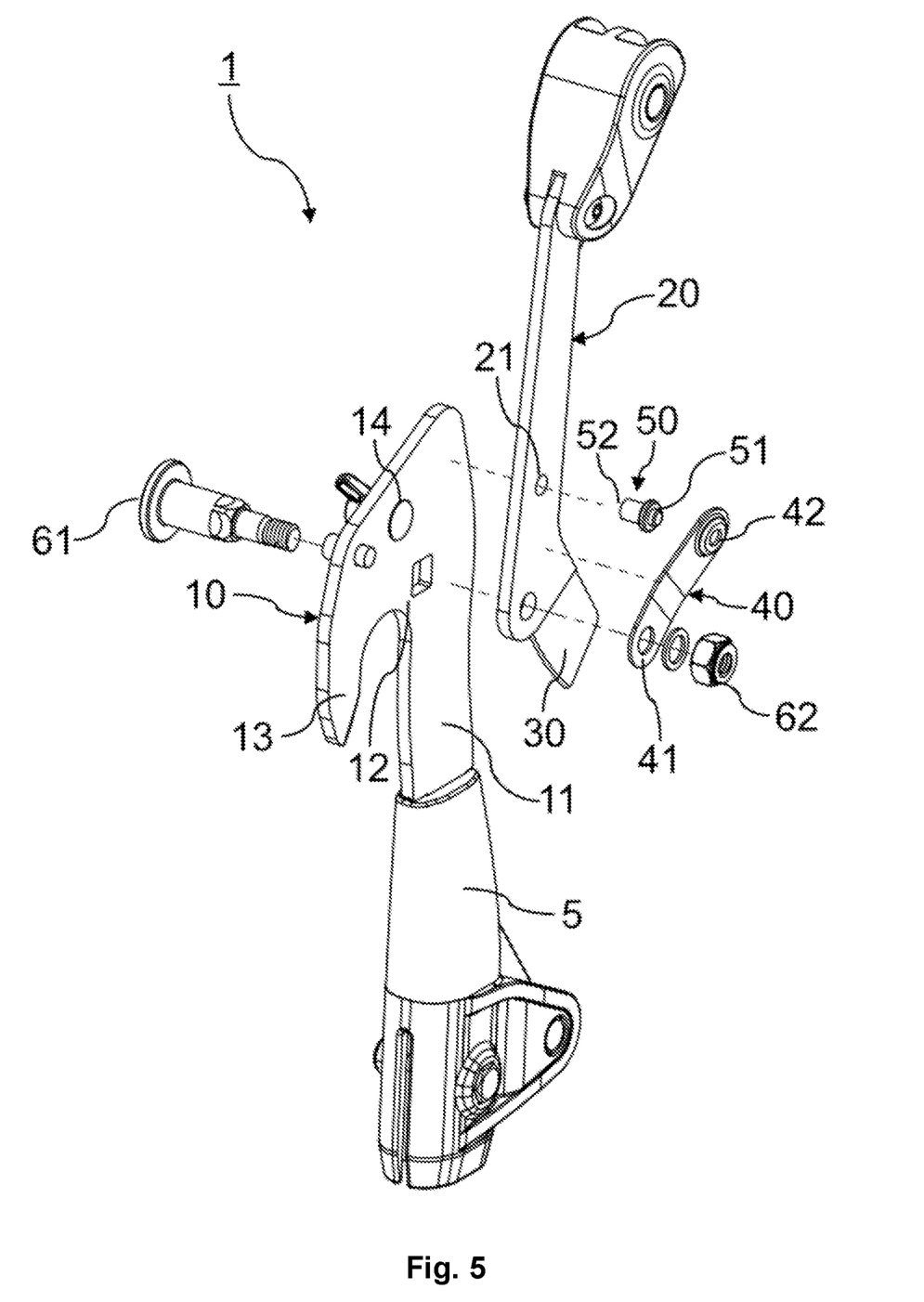
FIG. 5 is an exploded view of the head portion of the tree pruner according to the preferred embodiment of the present disclosure.

The pruner 1 further comprises a leaf spring 40 on an outer surface of the lever 20. A first end 41 of the leaf spring 40 is mounted to the first end of the lever 20. In the exemplary embodiment shown herein, the first end 41 of the leaf spring 40 is mounted onto the lever 20 at where the lever 20 is pivotally connected to the back hook 10 by the screw 61 and the nut 62. A second end 42 of the leaf spring 40 is connected to a first end 51 of a stop pin 50, wherein the stop pin 50 penetrates a middle portion of the lever 20 through a hole 21 (FIG. 5).

The lever 20 is held at a first position when the tree pruner 1 is at shipping or store front (defined as a rest condition of the tree pruner shown in FIGS. 1-2 and 6-7), and pulled to a second position to get ready for use (FIGS. 3-4 and 8-10). The pruner 1 has a smaller width ($W_1$; see FIG. 1) when the lever 20 is at the first position than the second position ($W_2$; see FIG. 3). For example, when the lever 20 is at the first position, the width $W_1$ of the pruner 1 is less than 90%, less than 80%, less than 70%, less than 60%, less than 50%, less than 40%, less than 30%, less than 20%, less than 10%, or less than 5% of the width $W_2$ when the lever 20 is at the second position.

Figure 6:
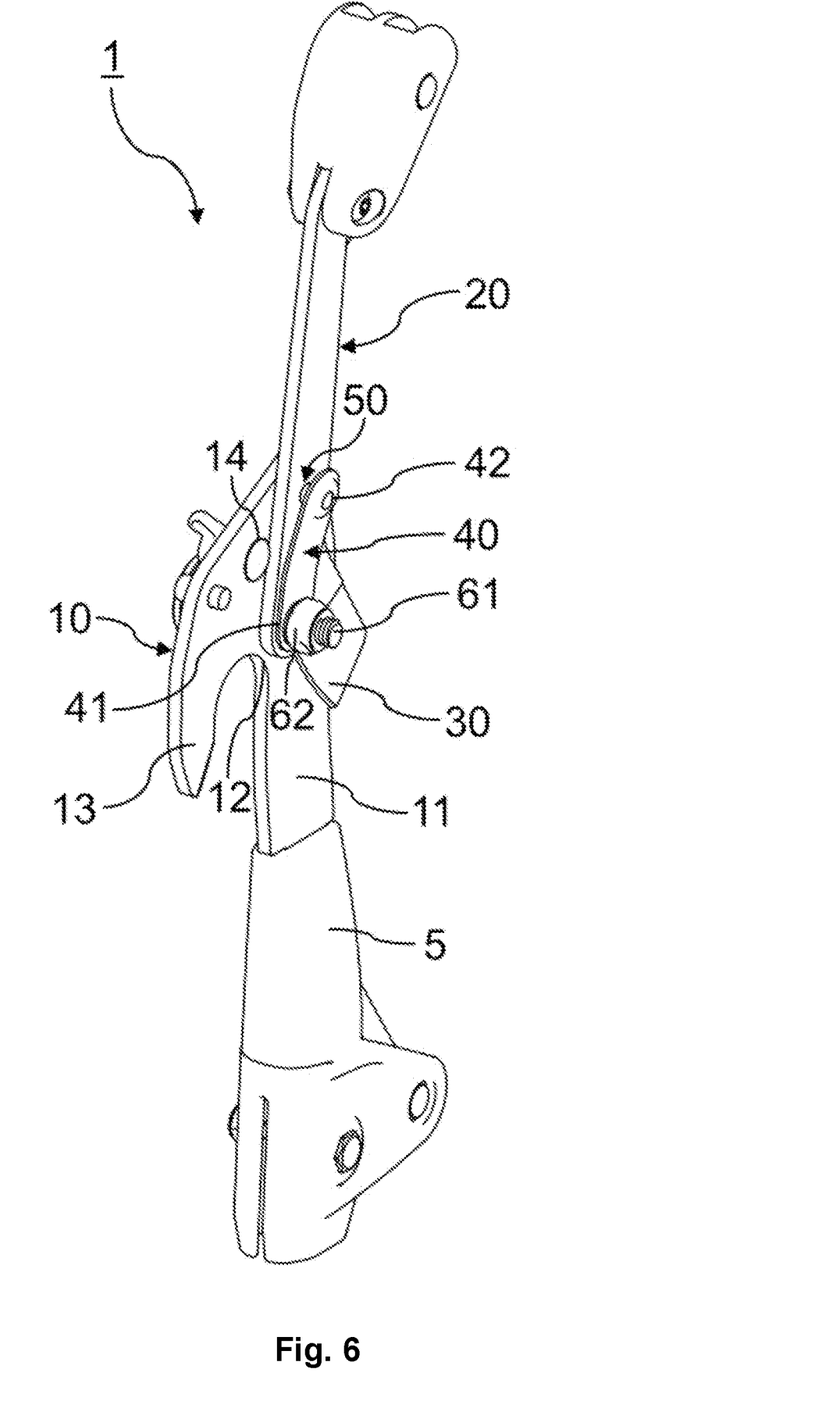
FIG. 6 is a left-side view of the head portion of the tree pruner when the lever is at the first position, according to the preferred embodiment of the present disclosure.
Figure 7:
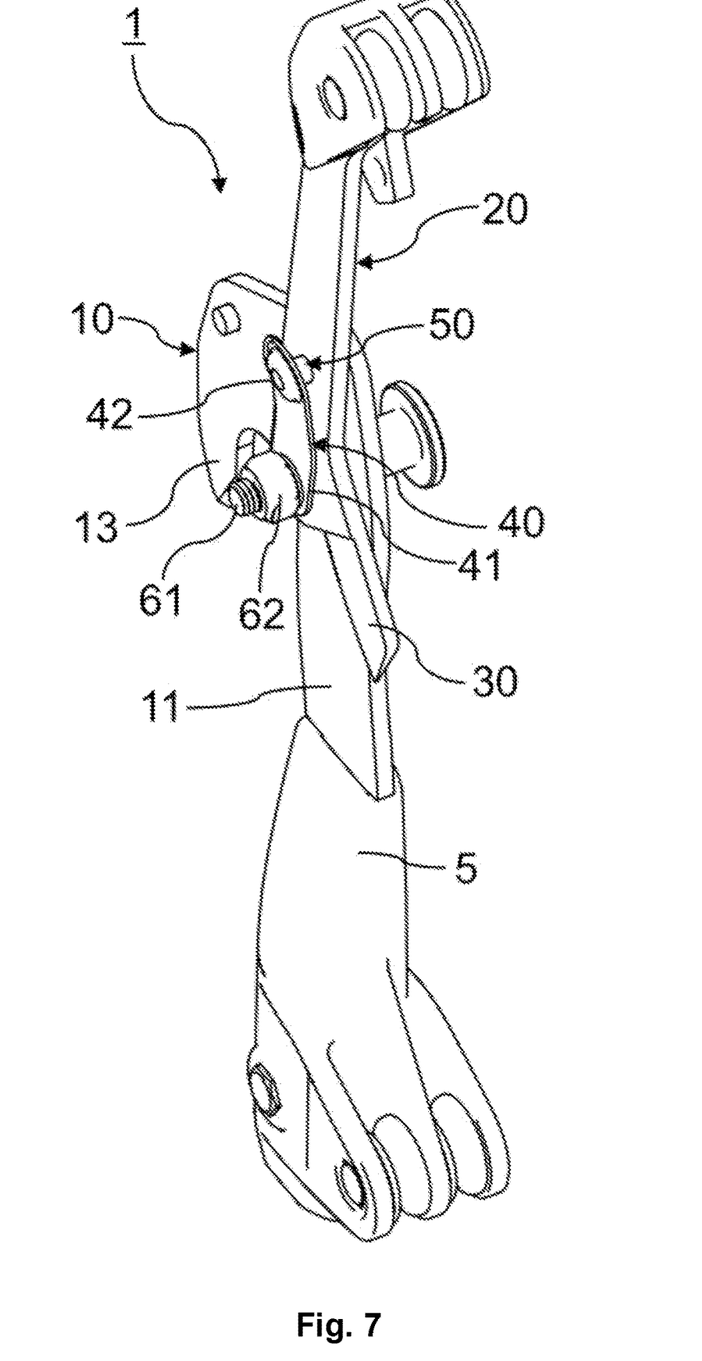
FIG. 7 is a right-side view of the head portion of the tree pruner when the lever is at the first position, according to the preferred embodiment of the present disclosure.
Figure 8:
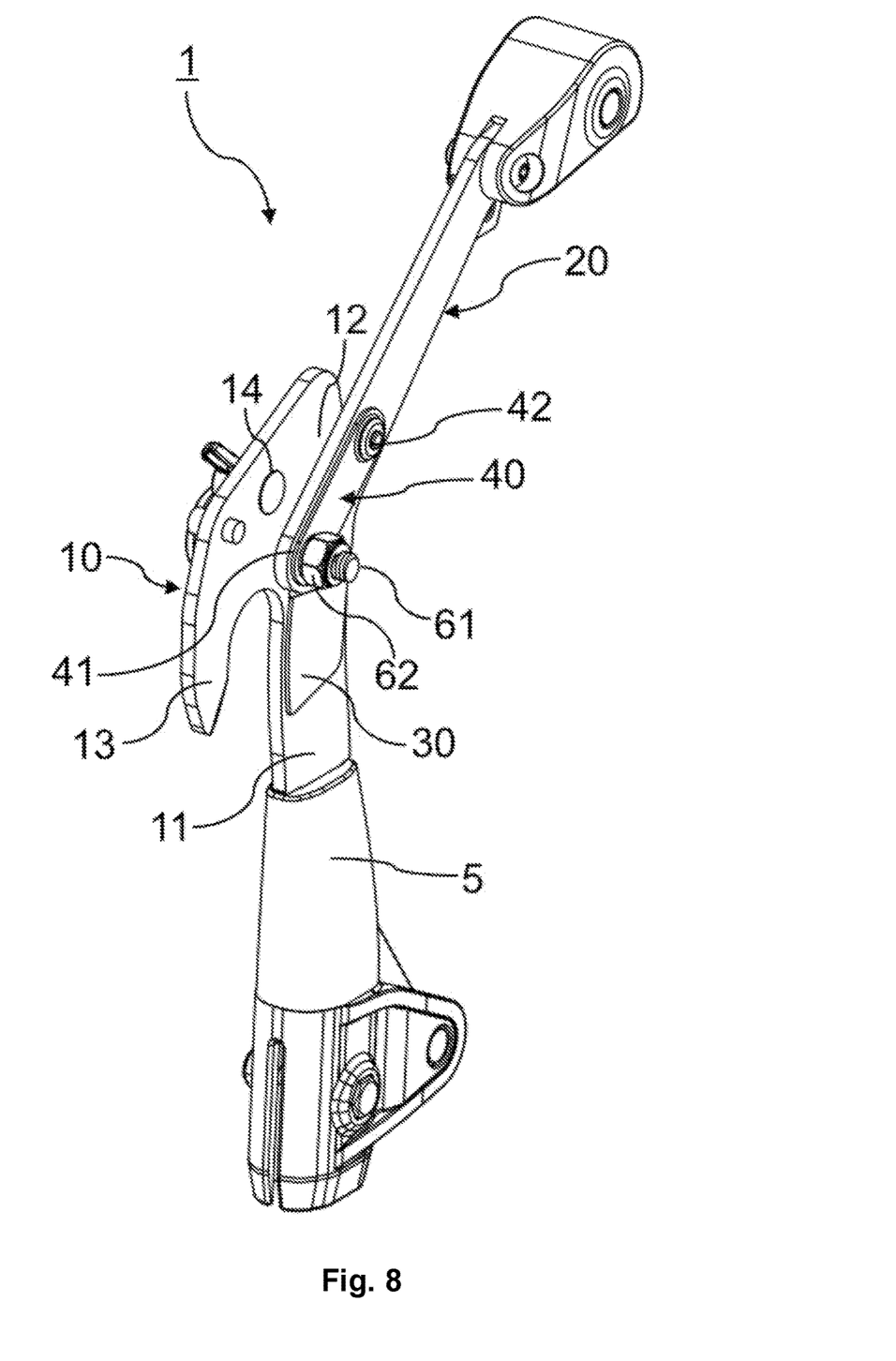
FIG. 8 is a left-side view of the head portion of the tree pruner when the lever is at the second position, according to the preferred embodiment of the present disclosure.
Figure 9:
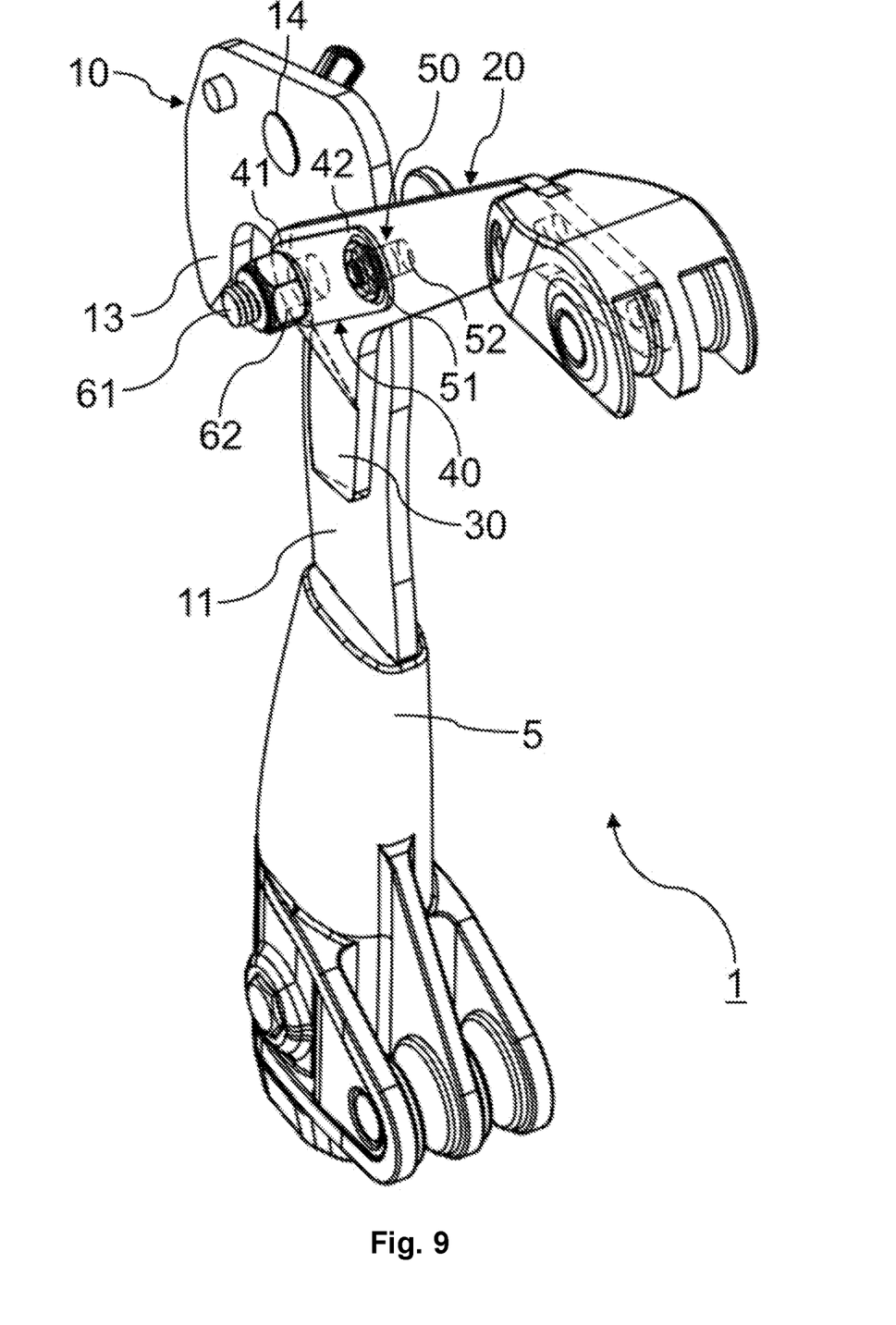
FIG. 9 is a right-side view of the head portion of the tree pruner when the lever is at the second position, according to the preferred embodiment of the present disclosure.
Figure 10:
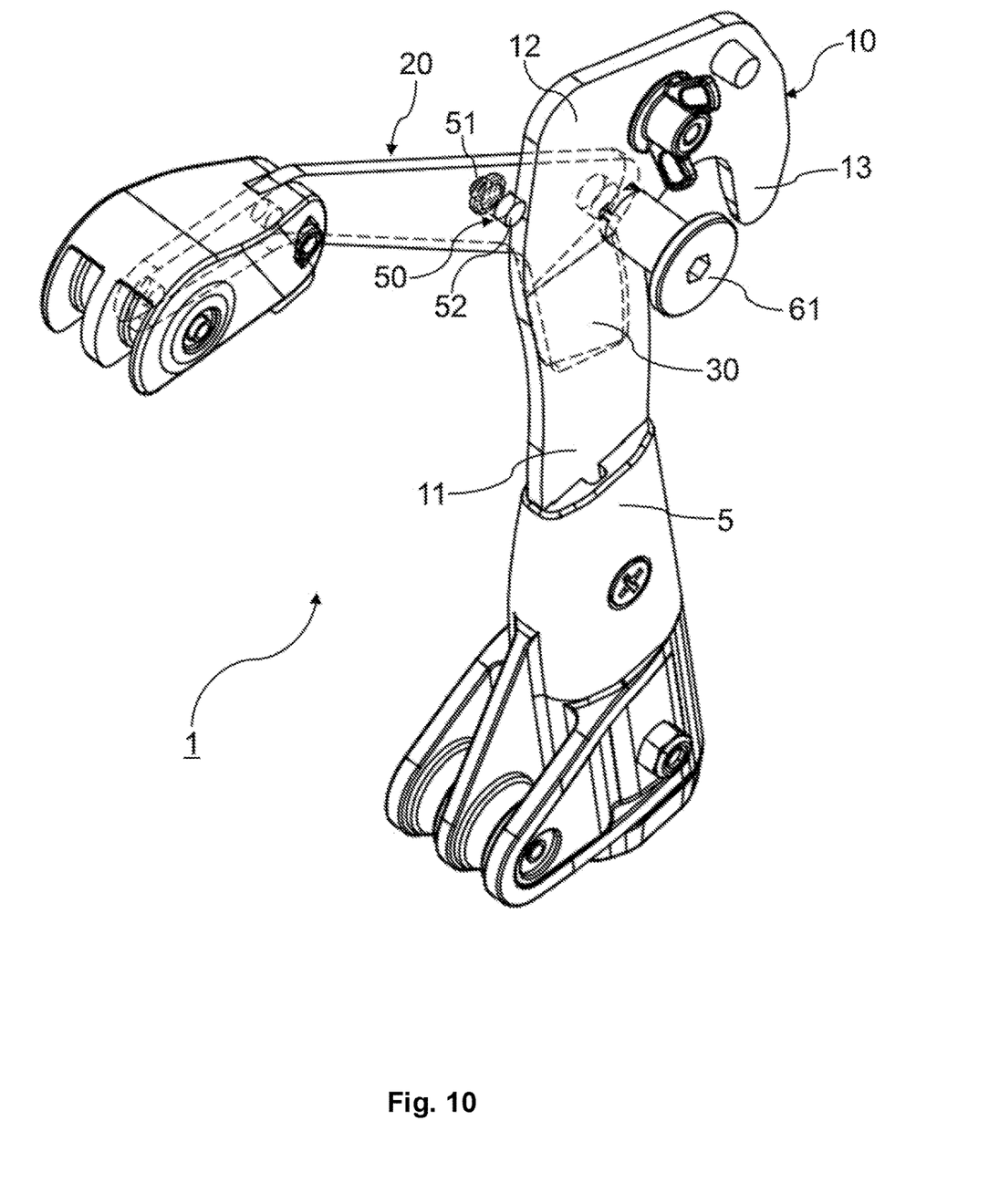
FIG. 10 is a right-side-rear view of the head portion of the tree pruner when the lever is at the second position, according to the preferred embodiment of the present disclosure.

As shown in FIGS. 1-2 and 6-7, when the lever 20 of the tree pruner 1 is at the first position, the leaf spring 40 is in tension. The second end 42 of the leaf spring 40 presses the first end 51 of the stop pin 50, such that a second end 52 of the stop pin 50 presses an outer surface of the back hook 10. The tension of the leaf spring 40 exerts force on the stop pin 50 to engage with the outer surface of the back hook 10 to hold the lever 20 at the first position. At this position, only a portion, i.e., not an entirety of the stop pin 50 penetrates the lever 20 (FIGS. 6-7). When the lever 20 is at the first position, a bolt head 14 on the central portion 12 of the back hook 10 engages with a side of the lever 20 and acts as a hard stop to prevent the lever 20 rotating towards the direction of the extended portion 13 of the back hook 10 when the pruner 1 is at shipping or store front.

When the lever 20 is pulled to the second position to get ready for use, the tension of the leaf spring 40 is released once the second end 52 of the stop pin 50 leaves the outer surface of the back hook 10, and the leaf spring 40 pushes the stop pin 50 to penetrate more through the hole 21 of the lever 20. As shown in FIGS. 3-4 and 8-10, after the lever 20 is pulled to the second position to get ready for use, the leaf spring 40 is at rest. A greater portion of the stop pin 50 penetrates the lever 20. At this position, the stop pin 50 engages with an edge of the back hook 10 to restrict movement of the lever 20 to where the stop pin 50 engages with the edge of the back hook 10, i.e., the stop pin 50 serves as an end stop for the movement of the lever 20.

Thus, the arrangement of the stop pin 50 reduces the width of the head portion of the tree pruner 1 at shipping and store front by holding the lever 20 at the first position. This configuration allows the tree pruner 1 to be less wide at shipping and store front than it will be during use, such that the shipping cost and store front space is reduced.

After use of the tree pruner 1, if the user would like to reset the lever 20 to the first position, the user can push the stop pin 50 backward through the hole 21 and move the lever 20 back to the first position, so that the leaf spring 40 is in tension and exerts force on the stop pin 50 to engage with the outer surface of the back hook 10 to hold the lever 20 at the first position.

All the components of the tree pruner 1 can be manufactured by any materials that are suitable for endurable use. The shape and dimension of each component can vary from the preferred embodiments shown herein within the scope of the disclosure.

In the foregoing description, certain terms have been used for brevity, clarity, and understanding. No unnecessary limitations are to be inferred therefrom beyond the requirement of the prior art because such terms are used for descriptive purposes and are intended to be broadly construed. The different configurations and systems described herein may be used alone or in combination with other configurations and systems. It is to be expected that various equivalents, alternatives and modifications are possible within the scope of the foregoing description.

Any version of any component of the disclosure may be used with any other component of the disclosure. The elements described herein can be used in any combination whether explicitly described or not.

As used herein, the singular forms "a," "an," and "the" include plural referents unless the content clearly dictates otherwise.

As used herein, the term "or" is an inclusive "or" operator and is equivalent to the term "and/or" unless the context clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

The systems of the present disclosure can comprise, consist of, or consist essentially of the essential elements and limitations described herein, as well as any additional or optional components, or limitations described herein or otherwise useful in the art. The disclosure provided herein suitably may be practiced in the absence of any element which is not specifically disclosed herein.

While this disclosure may be embodied in many forms, what is described in detail herein is a specific preferred embodiment of the disclosure. The present disclosure is an exemplification of the principles of the disclosure is not intended to limit the disclosure to the particular embodiments illustrated. It is to be understood that this disclosure is not limited to the particular examples, configurations, and materials disclosed herein as such configurations and materials may vary somewhat. It is also understood that the terminology used herein is used for the purpose of describing particular embodiments only and is not intended to be limiting since the scope of the present disclosure will be limited to only the appended claims and equivalents thereof.

What is claimed is:

1. A tree pruner comprising at a head portion:
   a back hook having a first portion connected to a distal end of a pole, a central portion extending distally from the first portion, and an extended portion projecting laterally from the central portion and bending proximally to form a hook;
   a lever having a first end pivotally connected to the central portion of the back hook and a second end extending distally from the first end, positioned away from the lateral projection of the extended portion of the back hook;

a blade having a distal end connected to the first end of the lever, and configured to move towards the extended portion of the back hook to complete a cutting motion when the second end of the lever is actuated; and a leaf spring on an outer surface of the lever, wherein the leaf spring has a first end mounted to the first end of the lever via the pivotal connection between the lever and the back hook, and a second end connected to a first end of a stop pin, wherein the stop pin penetrates a middle portion of the lever.

2. The tree pruner of claim 1, wherein, in a rest condition, the lever is in a first position, and during the completion of the cutting motion, the actuation of the second end of the lever moves the lever from the first position to a second position, wherein, when the lever is in the first position, the stop pin does not fully penetrate the lever, the leaf spring is in tension, and the second end of the leaf spring exerts force on the first end of the stop pin, such that a second end of the stop pin engages with an outer surface of the back hook to hold the lever in the first position; and wherein, when the lever is in the second position, a greater portion of the stop pin penetrates the lever compared to the first position, the leaf spring is at rest, and the stop pin engages with an edge of the back hook to restrict the movement of the lever to where the stop pin engages with the edge of the back hook; and wherein the tree pruner has a smaller width when the lever is in the first position than the second position.

* * * * *